United States Patent
Tutschka

[19]

[11] Patent Number: 6,052,979
[45] Date of Patent: *Apr. 25, 2000

[54] BLADE FOR A ROTARY MOWER AND ROTARY MOWER

[75] Inventor: Alfred Tutschka, Am Berg 16, 64546 Mörfelden-Walldorf, Germany

[73] Assignee: Alfred Tutschka, Morfelden-Walldorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/695,780

[22] Filed: Aug. 1, 1996

[30] Foreign Application Priority Data

Aug. 5, 1995 [DE] Germany .......................... 195 28 832

[51] Int. Cl.⁷ .................................................. A01D 34/63
[52] U.S. Cl. ...................... 56/295; 56/17.5; 56/DIG. 20
[58] Field of Search ........................... 56/17.5, 255, 295, 56/DIG. 17, DIG. 20

[56] References Cited

U.S. PATENT DOCUMENTS

| | | | |
|---|---|---|---|
| 2,663,984 | 12/1953 | Clark | 56/13.7 |
| 3,134,212 | 5/1964 | Gary | 56/16.4 R |
| 4,318,268 | 3/1982 | Szymanis | 56/295 X |
| 4,936,884 | 6/1990 | Campbell | 56/255 X |
| 5,094,065 | 3/1992 | Azbell | 56/255 |
| 5,191,756 | 3/1993 | Kuhn | 56/17.5 |
| 5,210,998 | 5/1993 | Hojo et al. | 56/255 |
| 5,299,414 | 4/1994 | Long | 56/295 X |
| 5,442,902 | 8/1995 | Mosley et al. | 56/17.5 X |
| 5,457,947 | 10/1995 | Samejima et al. | 56/17.5 X |
| 5,473,873 | 12/1995 | Sheldon | 56/255 |
| 5,483,790 | 1/1996 | Kuhn et al. | 56/17.5 |
| 5,606,944 | 3/1997 | Kurihara | 56/17.5 X |
| 5,669,213 | 9/1997 | Britton | 56/17.5 |

FOREIGN PATENT DOCUMENTS

| | | | |
|---|---|---|---|
| 259292 | 1/1968 | Austria | 56/17.5 |
| 0 300 642 A1 | 1/1989 | European Pat. Off. . | |
| 0 498 294 A1 | 1/1992 | European Pat. Off. . | |
| 0 514 209 A1 | 11/1992 | European Pat. Off. . | |
| 40 34 978 A1 | 5/1992 | Germany . | |
| 41 20 278 A1 | 12/1992 | Germany . | |
| 2077564 | 12/1981 | United Kingdom | 56/295 |
| WO 92/02121 | 2/1992 | WIPO . | |

*Primary Examiner*—John A. Ricci
*Attorney, Agent, or Firm*—Henderson & Sturm LLP

[57] ABSTRACT

A blade for a rotary mower, in particular lawnmowers, with a cup-like downward open cover (21) for the seating of the blade (1) presenting two sails (4, 4') that are provided on their front longitudinal edges (5, 5') in the direction of rotation with cutting edges (6, 6). The cutting edges of the blade sails of the blade according to the present invention constitute several cutting planes, whereby the outer cutting edge section (8) within the region of the sail extremities is located below the plane of the blade's hub portion (3). To this outer cutting edge section (8, 8') is attached a central cutting edge section (10, 10') that curves above the plane of the hub portion (3) and changes over to an inner cutting edge section (13, 13') that drops off toward the hub portion (3). The sail extremities (7, 7'), of which the front longitudinal edges are positioned in the direction of rotation below the plane of the hub portion (3), are designed as guide surfaces (36, 36') at a slant with respect to the blade's plane of rotation, with such guide surfaces curving upwards from the front longitudinal edges of the blade's sails (4, 4') in the direction of rotation toward the rear longitudinal edges. The rear longitudinal edges in the direction of rotation of the blade's sails extend within or above the plane of the hub portion (3). The guide surfaces (36, 36') cause that the material cut by the outer cutting edge section (8, 8') is lifted, thus repeatedly reaching the sphere of action of the central and the inner cutting edge sections; this brings about that the cut material is repeatedly reduced in size until it is pulverized. The invention further relates to a rotary mower with a cup-like, downward open cover, in which is seated the blade according to the present invention. Further, the invention relates to a retrofit kit for a conventional lawnmower presenting a cover with a lateral ejection opening.

17 Claims, 7 Drawing Sheets

BLADE FOR A ROTARY MOWER AND ROTARY MOWER

FIELD OF THE INVENTION

The invention relates to a knife blade for a rotary mower, and to a rotary mower equipped with such a blade. Further, the invention relates to a retrofit kit for such a rotary mower.

BACKGROUND OF THE INVENTION

Rotary mowers equipped with a double-sail blade, that rotates in a downward cut-out cover, are known as lawnmowers. The blade is driven either electrically or by means of an internal-combustion engine. The known lawnmowers are propelled either on rollers or are designed as so-called air-cushion mowers.

In the case of conventional lawnmowers, the lateral wall of the cover shielding the rotating blade is provided with an ejection hole for the clippings, which hole ends in a collecting bag to catch the clippings ejected by the blade. Blades are known in the art, that are provided in the area of their sail extremities with deflector elements for the ejection of the clippings, which elements protrude above the blade's plane of rotation and, with the rotation of the blade, carry with them the clippings and eject them through the ejection hole of the cup-shaped cover.

The rotary mower disclosed in DE 4,034,978, is equipped with a double-sail blade rotating inside a housing, the walls of which form a cylinder that completely encloses the blade's rotating orbit. At least in the area of the sail extremities, the blade is provided in its direction of rotation at its rear longitudinal edges with deflector elements, that protrude upwards beyond of the blade's plane at one of the sail extremities and downwards at the other sail extremity. The inverse design of the deflector elements at both sail extremities results in that the clippings are ejected upwards by one of the deflector elements and downwards by the other. This process reduces the size of the clippings to such an extent that they can be used as natural fertilizer. In a preferred specific embodiment, the blade sails are provided with U-shaped sections formed from the blade's plane of rotation, along which run the cutting edges of the blade. Practice has shown, however, that especially in the case of longer and damp material to be cut, it was not always possible to obtain a sufficient pulverization of the clippings.

EP 0 300 642 describes a blade for a rotary mower with two sails, on which the front longitudinal edges are provided in their direction of rotation with cutting edges. Each of the cutting edges of the known blade is contoured in the direction of rotation by forming an outer cutting edge section located below the plane of the hub portion, to which section is attached a cutting edge section located on the plane of the hub portion. The sail extremities of the known blade are shaped as upwards slanted guide surfaces opposite the blade's plane of rotation. However, the outer edge areas of the sail extremities are not slanted upwards in order to maintain the lowest possible generating of noise.

The object of the invention is to devise a knife blade for a rotary mower that, even with longer and wet material to be cut, renders satisfactory mowing results and almost pulverizes the clippings. Another object of the invention is to devise a rotary mower with an improved mowing performance, that almost pulverizes the clippings. Still another object of the invention is to devise a retrofit kit by means of which a conventional rotary mower, that presents a cover with an ejection hole on one of its sides, can be retrofitted, so that it ejects in a downward direction the almost pulverized clippings.

SUMMARY OF THE INVENTION

The knife blade according to the present invention finds its advantageous use in a rotary mower that presents a downward cut-out cup-like cover for the seating of the knife blade, of which the lateral wall extends below the plane of the outer cutting edge section, that is to say, the lowest cutting plane of the knife blade, and encloses the blade's rotating orbit by forming an annular gap. An especially effective trituration of the clippings is obtained if the rotary mower's cover constitutes a rotating closed cylinder, that is to say, if the housing does not present a lateral ejection hole. Further, it is preferable if the cup-like cover is provided on its upper side with one or several ventilation apertures. These apertures have the effect that the air drawn into the cup-like cover from below, because of the blade rotation, can be at least partly vented upwards. The bottom rim of the rotary mowers's cover is preferably bent inward, so that the clippings are retained within in a better manner. Furthermore, the inward bent bottom rim of the cover prevents the ejecting of stones or other foreign objects. The housing shall encompass the blade shape in such a manner so as present the least possible clearance. This will prevent the depositing of larger amounts of clippings on the inside cover wall.

However, the blade according to the present invention can also be advantageously used in rotary mowers that are equipped with several units arranged next to each other, each of which is provided with a blade rotating inside a cover, in which the housings of adjacent knife blades are provided with an aperture for the ejection of the clippings from one unit to the next one.

In the case of the blade according to the present invention, the cutting edges of the blade sails constitute several cutting planes whereby the outer cutting edge section, located within the area of the sail extremity, lies below the plane of the hub portion of the blade. To this outer cutting edge section is attached a central cutting edge section, that curves above the plane of the hub portion, and by an inner cutting edge section, that runs into the hub portion. The sail extremities of the blade, whose front longitudinal edges extending in the direction of rotation lie below the plane of the hub portion, are shaped as slanted guide surfaces opposite the blade's plane of rotation; these guide surfaces, starting from their front longitudinal edge extending in the direction of rotation, ascend toward the rear longitudinal edge. The guide surfaces cause that the clippings cut by the outer cutting edge section of each blade wing are lifted, thus reaching repeatedly the sphere of action of the central and inner cutting edge sections with the result that a repeated trituration takes place until the cuttings are pulverized. Because the rear longitudinal edges of the blade sails, extending in the direction of rotation, are essentially within or above the plane of the hub portion, the clippings that are lifted by the outer guide surfaces, thus reaching the sphere of action of the central and inner cutting edge sections, are ejected without being pressed against the ground. Thus, it is possible to obtain an effective size reduction of the clippings.

In an advantageous embodiment of the blade, the sail extremities are provided behind the cutting edges with additional deflector elements in the direction of rotation, which deflectors extend in the blade longitudinal direction projecting downwards and/or upwards. The deflector elements catch the cut material and contribute to the trituration process. Further, the dividers cause a stabilization of the rotating blade.

While the bottom deflector element is positioned at a right angle on the plane of rotation of the blade, the upper deflector element is advantageously slanted backwards in the direction of rotation. Because of the pitch, the clippings caught by the deflector element are carried upwards, so that the deflector element serves as an additional guide element.

Such a blade, equipped with deflector elements, can be used in an advantageous manner in rotary mowers, which present several laterally cut-out cup-like covers each for the seating of a blade. The deflector elements accelerate the clippings and eject them laterally, so that said clippings are carried from the sphere of action of the one blade housed in a cover to the sphere of action of the blade in the adjacent cover.

The retrofit kit according to the present invention for a conventional rotary mower consists of the blade according to the present invention and a cylinder-shaped cover that fits into the rotary mower's housing as well as fasteners with which the cover can be secured to the housing of the mower. The cover encompasses the blade's rotating orbit by forming an annular gap and prevents that the clippings are ejected through the lateral cut-out, generally present in conventional lawnmowers. The bottom rim of the cover is advantageously bent inward in order to improve the retention of the cut material and to prevent the lateral ejection of stones or other foreign objects.

BRIEF DESCRIPTION OF DRAWINGS

Several embodiments of the invention are illustrated below by way of example in the accompanying drawings in which.

DETAILED DESCRIPTION

Figure 1:
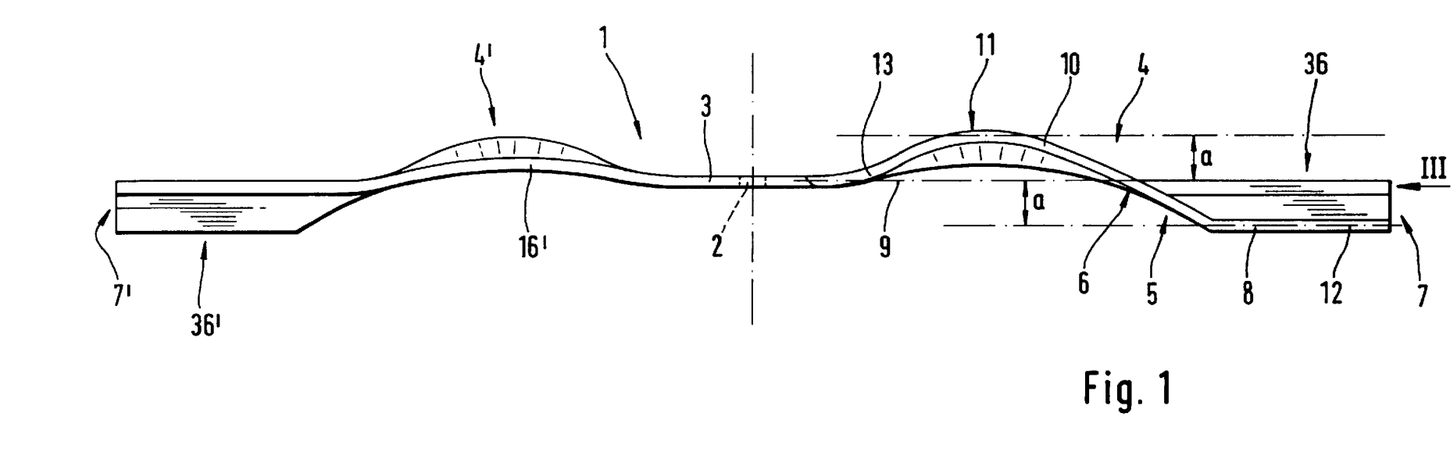
FIG. 1 is a lateral view of a first embodiment of the blade according to the present invention
Figure 2:
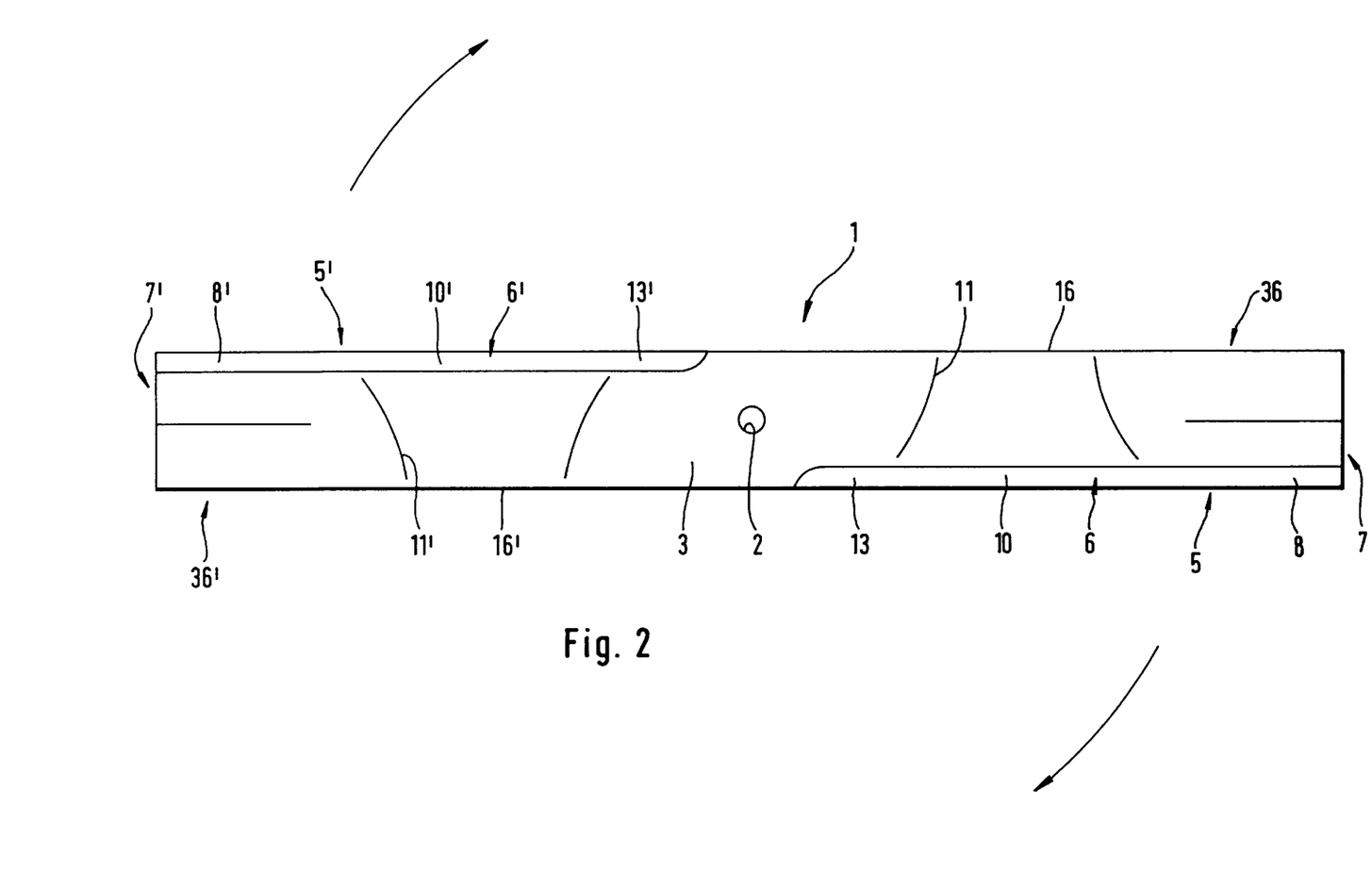
FIG. 2 is a plan view of the two-sail blade shown in FIG. 1

In FIG. 1 is shown a lateral view of an embodiment of the blade 1, according to the present invention, and in FIG. 2 is shown the plan view of the blade 1. The blade 1 consists of a hardened, bent flat-bar steel having a length of 40 cm and a width of 5 cm. The blade 1 presents a hub portion 3 provided with a bore hole 2 for the seating of a fastening screw for the lawn-mower's drive shaft, from which hub portion extend two sails 4, 4'. In the direction of rotation, the blade sails 4, 4' are each provided on their front longitudinal edges 5, 5' with a cutting edge 6, 6', extending from the sail extremity 7, 7' to the hub portion 3 of the blade 1. They are shaped by forming an outer cutting edge section 8, 8', that runs for about 5 cm along the blade's longitudinal direction below the hub portion's 3 plane 9, represented by a dotted line in FIG. 1.

Attached to the outer cutting edge 8, 8' is a central cutting edge 10, 10' that is formed by a bulging 11, 11' in the direction of rotation by the front region of the blade sail 4, 4'. The central cutting edge section 10, 10' extends in a curved course from the cutting plane 12 of the lower cutting edge section 8, 8' beyond the plane 9 of the hub portion 3. To the central cutting edge section is attached an inner cutting edge section 13, 13' that flattens out and runs into the hub portion 3.

The distance between the top part of the cutting edge 6, 6' and the plane 9 of the hub portion 3 corresponds roughly to the distance a between the lower cutting plane of the blade 1, that is to say, the plane 12 of the outer cutting edge section 8, 8' and the plane 9 of the hub portion 3.

The sail extremities 7, 7' of blade 1 are designed as slanted guide surfaces 36, 36' which, starting from the outer cutting edge section 8, 8', ascend in the direction of rotation to the rear longitudinal edge of blade 1 extending approximately to the level of plane 3 of the hub portion.

Figure 3:
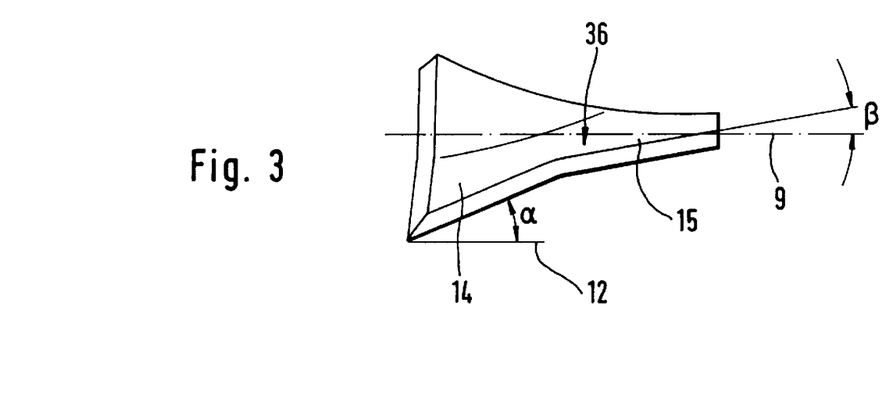
FIG. 3 is a view of the blade shown in FIG. 1 seen from the direction of arrow III

FIG. 3 shows the blade 1 from the direction of the arrow III in FIG. 1. While the front region 14 of the guide surfaces 36, 36' in the direction of rotation presents a relatively high angle of approximately 20–30° compared to the plane of rotation 9 of the blade, the rear region 15 of the guide surfaces 36, 36' breaks off and together with the plane of rotation 9 forms an angle of about 10–20°.

In the region of their rear longitudinal edges 16, 16', the blade sails 4, 4' flatten out in the direction of rotation. The rear longitudinal edges 16, 16' of the blade sails 4, 4' are slightly curved upward only in the region of the bulging 1, 11'. They essentially extend along the level of the plane 9 of the hub portion 3.

Figures 4, 6:
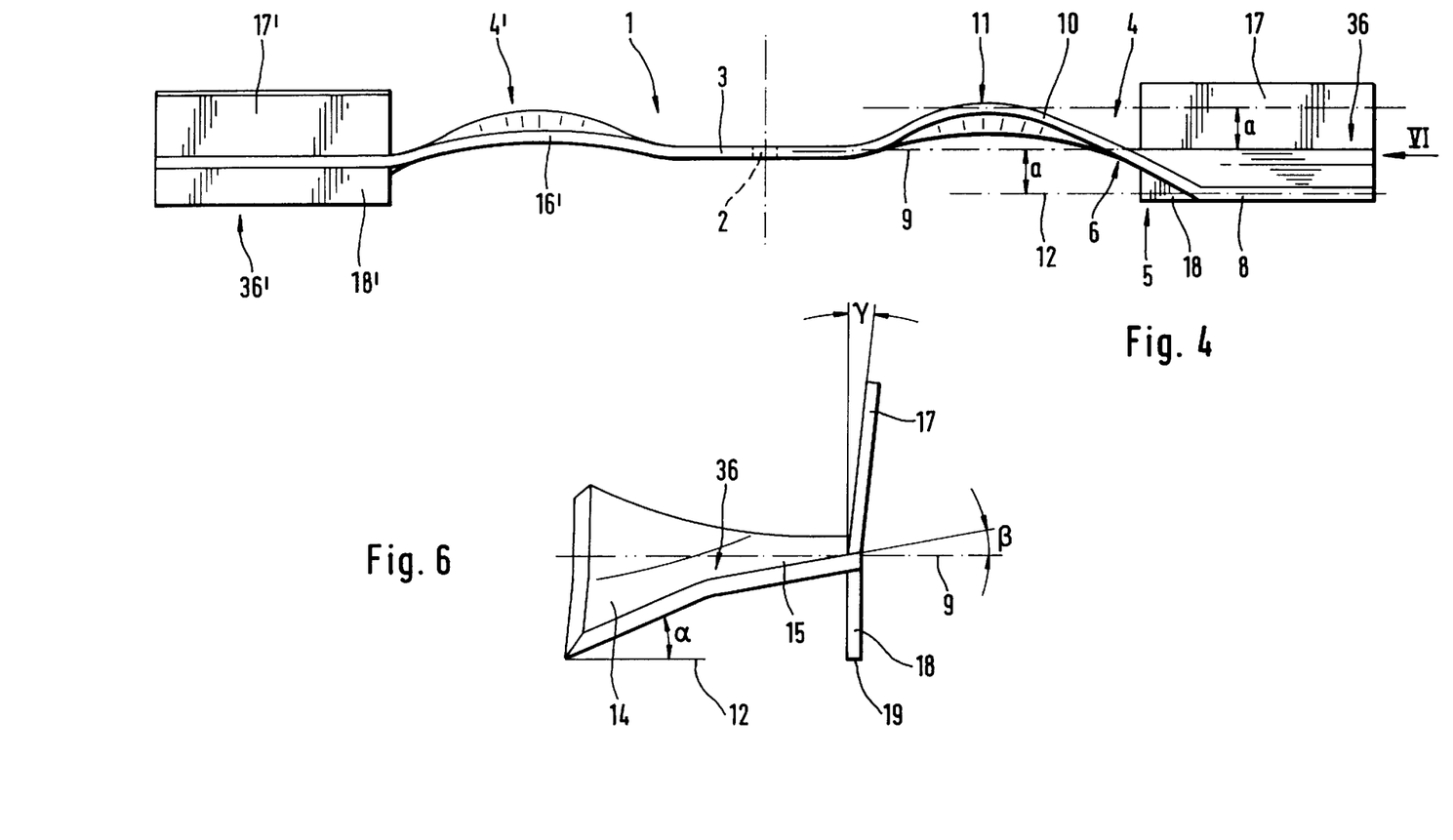
FIG. 4 is a lateral view of another embodiment of the blade according to the present invention
FIG. 6 is a view of the blade shown in FIG. 4 seen from the direction of arrow IV
Figure 5:
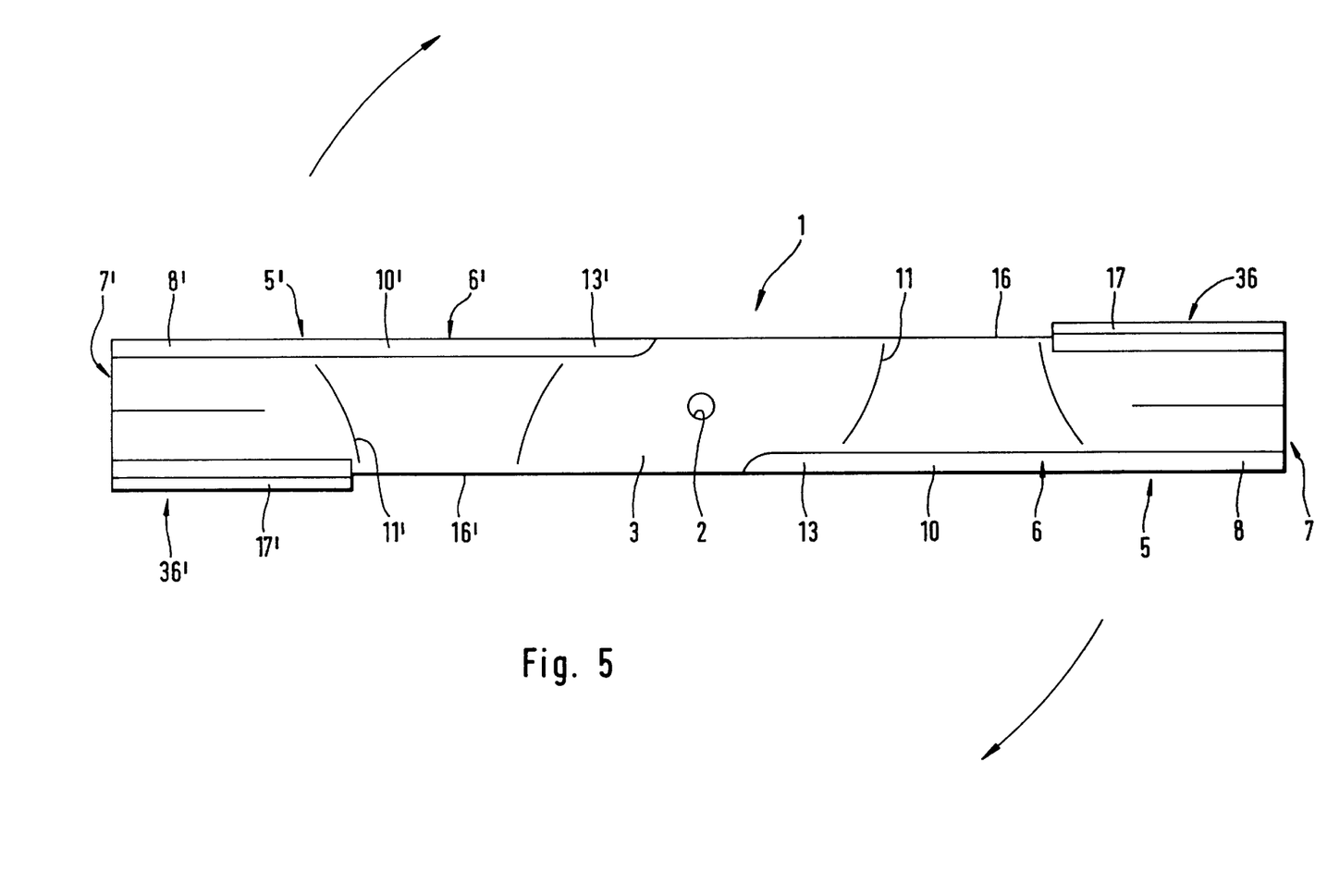
FIG. 5 is a plan view of the blade shown in FIG. 4 provided with deflector elements

With reference to FIGS. 4 to 6, below is described another embodiment of the blade according to the present invention, in which embodiment the corresponding components are designated by the same reference numerals. This embodiment differs from the embodiment described with reference to FIGS. 1 to 3 in that it presents lateral deflector elements 17, 17' and 18, 18' that are attached to the top and the bottom sides of each blade sail 4, 4'.

The deflector elements 17, 17' and 18, 18' are shaped as flat plates that consist of the same material as blade 1, and are welded onto the blade sails 4,4'. They extend in the blade's longitudinal direction from the sail extremities 7, 7' to about the central cutting edge sections 10, 10' or, rather, somewhat beyond it. The bottom deflector element 18 is perpendicular to the plane of rotation of the blade 1, with its bottom edge 19 ending at the cutting plane 12 of the other cutting edge section 8.

The upper deflector element 17, 17' presents about twice the surface of the bottom deflector element 18, 18'. With regard to a plane perpendicular to the plane of rotation 9 of the blade, it is positioned in direction of the rotation slanted backward at an angle γ of about 5–20°, preferably 10°. Because of its pitch, the upper deflector element 17, 17' causes that the cut material be carried upward. In this respect, it serves as additional guide element.

Figure 7:
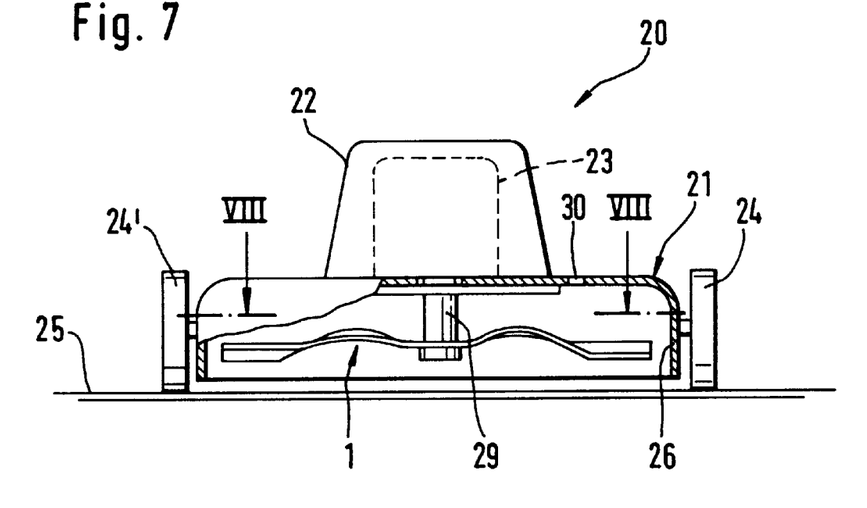
FIG. 7 is a partly sectional view of a lawnmower with an electrically driven blade

FIG. 7 shows a lawnmower with the blade 1 according to the present invention. The lawnmower 20 presents a cup-like, downward cut-open housing 21 for the inserting of the blade 1. On top of the housing is placed a hood 22 that encloses an electric motor 23, shown only by way of indication, for the drive of the blade. The lawnmower 20 is equipped with each two front and two rear wheels 24, 24', that are affixed at lateral bearings and enable a height adjustment of the cup-like housing cover with respect to the ground 25. Further, to the housing is attached a control bar, not shown in FIG. 7, for the pushing of the lawnmower 20.

Figure 8:
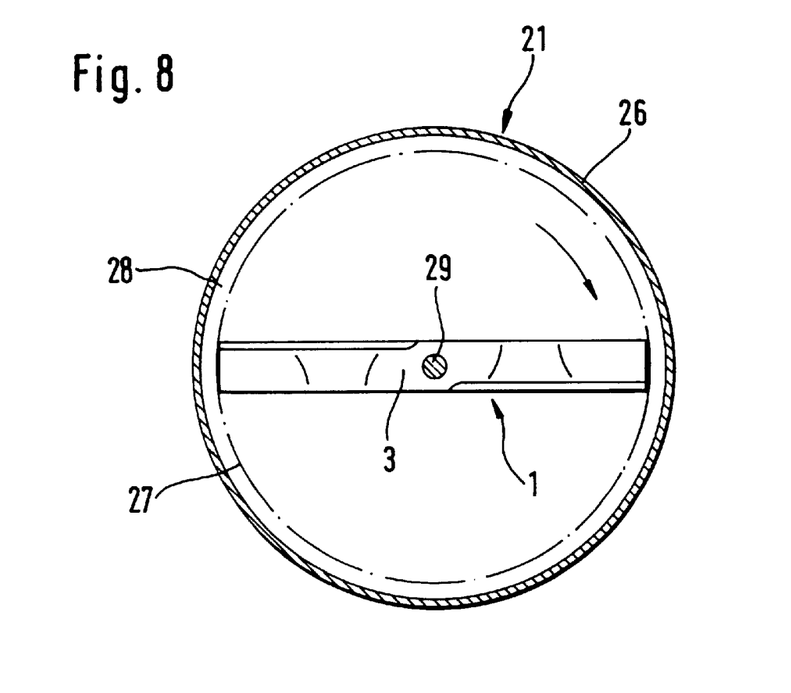
FIG. 8 is a sectional view of the cup-like cover of the lawnmower as seen along the line XIII—XIII in FIG. 7

The wall 26 of the cup-like cover 21 of the lawnmower 20 encompasses the blades's 1 rotating orbit 27 by forming a narrow annular gap 28 (FIG. 8). It does not present a lateral ejection hole and extends below the cutting plane 12 of the outer cutting edge section 8 of blade 1, whose hub portion 3 is screwed onto the drive shaft 29 of the electric motor 23. The top of the cup-like cover 21 is provided along the periphery around the hood 22 with vents 30.

During the operation of the lawnmower, the cut material is carried by the special shape of the rotating blade 1 in direction of the motor-facing wall of the cup-like housing cover 21 and reaches repeatedly the sphere of action of the blade 1, which catches the clippings along different cutting planes. The repeatedly triturated cut material is finally ejected by centrifugal force effect inside the cup-like cover 21 to the outside, and falls finely pulverized on the ground 25 in the proximity of the cover 21, laterally enclosing the blade.

Figure 9:
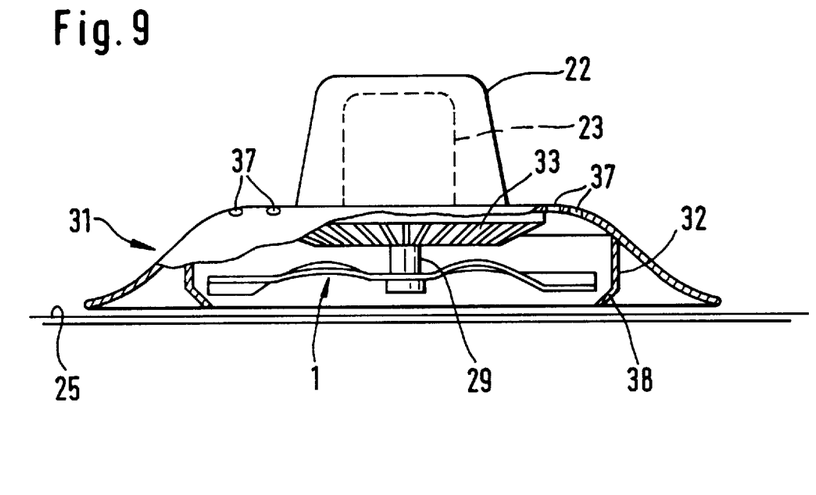
FIG. 9 is a partly sectional view of a lawnmower of air-cushion design with the blade according to the present invention

FIG. 9 shows another embodiment of the lawnmower according to the present invention, in which embodiment the corresponding components according to FIGS. 7 and 8 are designated by the same reference numerals. The lawnmower is of a so-called air-cushion design. The housing 31 of the air-cushion mower, flattening toward the outside, encloses a cylinder-shaped downward cut-out cover 32, in which is seated the blade 1. A guide vane 33 located above the blade 1 in the cover is torsionally affixed to the drive shaft 29 of the electric motor 23, which vane draws off the air by means of the vent 37 provided in the housing 31, supplying the required lift. The cylinder-shaped cover 32 presents a bottom rim 38 that is inward bent at an angle of about 30°. The bottom rim 38 of the cover 32 ends about at the level of the blade extremities.

Figure 10:
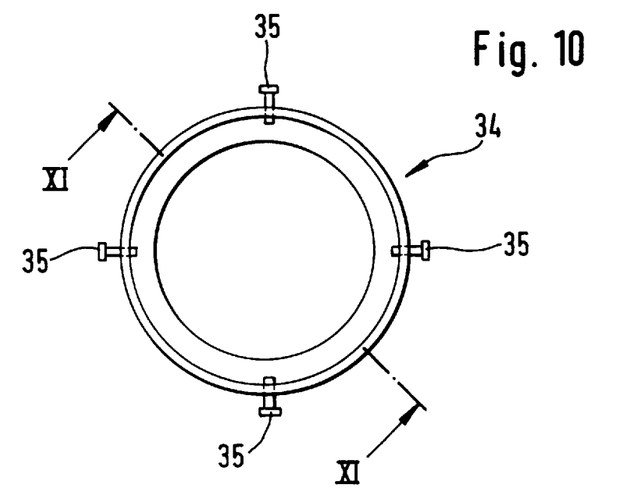
FIG. 10 is a plan view of the retrofit kit, according to the present invention, for a conventional rotary mower
Figure 11:
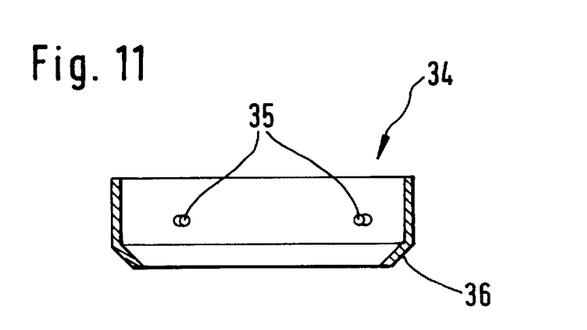
FIG. 11 is a sectional drawing as seen along the line XI—XI in FIG. 10.

With reference to FIGS. 10 and 11, below is described a retrofit kit with which a conventional lawnmower, that presents a lateral ejection hole, can be retrofitted. The retrofit kit consists of the blade 1, according to the present invention, and a cylinder-shaped cover 34 with fasteners 35. The cylinder-shaped cover 34 is designed in such a manner that it encloses the blade 1 by forming a narrow annular gap, and it presents a bottom rim 36 that is inward bent. The fasteners 35 are turnscrews that are arranged around the periphery on the wall of the cylinder-shaped cover 34. The cover can be inserted into the housing of a conventional lawnmower and be braced by means of the turnscrews that rest with their heads against the inside of the lawnmower's housing.

Because of the special design of the blade according to the present invention it is possible to obtain satisfactory mowing results even with longer and damp material to be cut. The clippings are ejected almost pulverized and can be kept on the ground as natural fertilizer.

Figure 12:
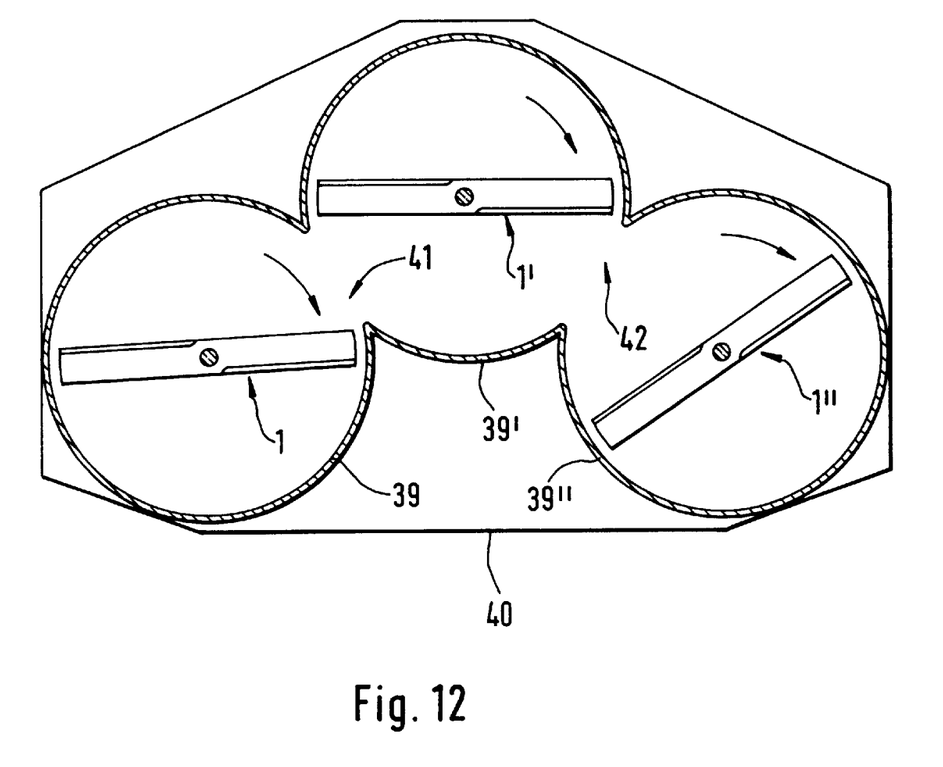
FIG. 12 is an inverted plan-view of a rotary mower with several blades.

FIG. 12 shows an inverted-plan view of a rotary mower with three blades 1, 1', 1". Each blade 1, 1' 1" rotates within its own cover 39, 39', 39". The covers are arranged next to each other in the housing 40 of the rotary mower, whereby the covers of adjacent blades each present a common opening 41, 42 to eject the cut material.

What is claimed is:

1. A blade for a rotary mower comprising at least two blade sails extending from a hub portion for a housing of a drive shaft of a rotary mower, said blade sails comprising, in the direction of rotation on front longitudinal edges, front edge regions comprising cutting edges that extend from extremities of the blade sail to the hub portion of the blade, each of the front edge regions being shaped in their direction of rotation to form an outer cutting edge section to which is attached a central cutting edge section curving above a plane of the hub portion, said central cutting edge section comprising an inner cutting edge section descending to the plane of the hub portion, whereby, in the direction of rotation, rear longitudinal edges of the blade sails extend essentially within or above the plane of the hub portion, wherein a central portion of the blade corresponding to the central cutting edge section comprises a concave surface from the perspective of the plane of the hub, said extremities being shaped as guide surfaces slanted with respect to a plane of rotation of said blade, and which, in the direction of rotation, starting from the front longitudinal edges of the blade sails, rise toward the rear longitudinal edges, wherein the outer cutting edge section is substantially parallel to and lies below the plane of the hub portion.

2. The blade according to claim 1, comprising deflector elements extending from the blade sails in the direction of rotation, at the extremities of the blade sails behind the cutting edges in a longitudinal direction of the blade.

3. The blade according to claim 2 wherein said deflector elements comprise bottom deflector elements extending upwardly with respect to a cutting plane of the outer cutting edge section.

4. The blade according to claim 2, wherein said deflector elements comprises upper deflector elements and bottom deflector elements, said upper deflector elements comprising surfaces larger than surfaces of the bottom deflector elements.

5. The blade according to claim 1 including deflector elements extending downwardly from the blade sails, said downwardly extending deflector elements being perpendicular to the plane of rotation of the blade, and deflector elements extending upwardly from the blade sails with respect to a plane perpendicular to the plane of rotation arc slanted backward in the direction of rotation.

6. The blade according to claim 1, wherein the guide surfaces comprise a rear region and a front region, said rear region having a lower pitch than a pitch of the front region in the direction of rotation.

7. A rotary mower comprising a housing, wheels attached to said housing, means for rotating a drive shaft, and at least one blade, said blade comprising at least two blade sails extending from a hub portion for a housing of a drive shaft of the rotary mower, said blade sails comprising front longitudinal edges comprising, in the direction of rotation, front edge regions comprising cutting edges that extend from extremities of the blade sail to the hub portion of the blade, each of the front edge regions being shaped in their direction of rotation to form an outer cutting edge section to which is attached a central cutting edge section curving above a plane of the hub portion, said central cutting edge section comprising an inner cutting edge section descending to the plane of the hub portion, whereby, in the direction of rotation, rear longitudinal edges of the blade sails extend essentially within or above the plane of the hub portion, wherein a central portion of the blade corresponding to the central cutting edge section comprises a concave surface from the perspective of the plane of the hub, said extremities being shaped as guide surfaces slanted with respect to a plane of rotation of said blade, and which, in the direction of rotation, starting from the front longitudinal edges of the blade sails, rise toward the rear longitudinal edges of the blade sails, wherein the outer cutting edge section is substantially parallel to and lies below the plane of the hub portion.

8. The rotary mower according to claim 7, wherein the blade is seated in a downward open cup-like cover.

9. The rotary mower according to claim 8, wherein a lateral wall of the cover extends up to below a plane of an outer cutting edge section to form a gap enclosing a rotating orbit of the blade.

10. The rotary mower according to claim 8 wherein the cover comprises an inward bent rim.

11. The rotary mower according to claim 8 wherein the cover comprises on its upper side with at least one vent.

12. The rotary mower according to claim 8 comprising at least two units comprising a blade for rotating inside a cup-like cover, said cover comprising an opening for cut material.

13. An air-cushion mower comprising a housing, means for rotating a drive shaft, and a blade comprising at least two blade sails extending from a hub portion for a housing of a drive shaft of the rotary mower, said blade sails comprising front longitudinal edges comprising, in the direction of rotation, front edge regions comprising cutting edges that extend from extremities of the blade sail to the hub portion of the blade, each of the front edge regions being shaped in their direction of rotation to form an outer cutting edge section to which is attached a central cutting edge section curving above a plane of the hub portion, said central cutting edge section comprising an inner cutting edge section descending to the plane of the hub portion, whereby, in the direction of rotation, rear longitudinal edges of the blade sails extend essentially within or above the plane of the hub portion, wherein a central portion of the blade corresponding to the central cutting edge section comprises a concave surface from the perspective of the plane of the hub, said extremities being shaped as guide surfaces slanted with respect to a plane of rotation of said blade, and which, in the direction of rotation, starting from the front longitudinal edges of the blade sails, rise toward the rear longitudinal edges of the blade sails, wherein the outer cutting edge section is substantially parallel to and lies below the plane of the hub portion.

14. The air-cushion mower according to claim 13, wherein the blade is seated in a downward open cup-like cover.

15. The air-cushion mower according to claim 14, comprising a cover comprising a lateral wall extending below a plane of an outer cutting edge section to form an annular gap encompassing a rotating orbit of the blade.

16. The air-cushion mower according to claim 14 wherein the cover comprises an inward bent bottom rim.

17. The air-cushion mower according to claim 16, comprising a guide vane arranged in the cover above the blade.

* * * * *